United States Patent Office 2,905,562
Patented Sept. 22, 1959

2,905,562

PROCESS FOR RENDERING MASONRY WATER-REPELLENT

Donald V. Brown, Schenectady, N.Y., assignor to General Electric Company, a corporation of New York No Drawing. Application July 29, 1957
Serial No. 674,555

5 Claims. (Cl. 106—12)

This invention is concerned with a process for rendering masonry water-repellent. More particularly, the invention relates to rendering water-repellent masonry which ordinarily is non-water-repellent, which process comprises treating such masonry with an aqueous solution comprising a preformed mixture of ingredients comprising a water-soluble alkali-metal silicate and a water-soluble alkali-metal salt of a hydrocarbon-substituted silanetriol, thereby effecting a substantial coating and penetration of the masonry with the aqueous solution, and thereafter permitting the treated masonry to dry whereby the masonry becomes water-repellent as a result of the drying of the solution on the surface and in the pores of the masonry without closing the pores of the latter.

Silicone resins have been suggested as compositions suitable for rendering water-repellent masonry which is originally non-water-repellent. However, the use of such silicone resins has been accompanied by several disadvantages. In the first place, it has been necessary to use the silicone resins in the form of solutions in organic solvents. Generally, such solvents are expensive, flammable, and fairly toxic, and when employed in small, confined areas offer a health hazard unless adequate ventilation is provided for. This is often difficult to do and for this reason extreme care must be exercised in using such solutions of organic resins and this has in some respects limited the use of silicone resins for rendering masonry water-repellent, especially in confined areas such as cellars of homes, etc.

Unexpectedly, I have now discovered that I can render water-repellent all kinds of masonry surfaces without regard to the type of masonry the water-repellents are applied, by treating the surfaces of such masonries with a mixture of an aqueous solution of an alkali-metal silicate and an alkali-metal salt of a hydrocarbon-substituted silanetriol (for brevity the alkali-metal salt of the hydrocarbon-substituted silanetriol will hereinafter be referred to as "alkali-metal silanolate"). It was entirely unexpected and in no way could be predicted that this combination of ingredients would impart the high degree of water-repellency to masonry surfaces since attempts to use either one of these water-soluble materials separately in the form of aqueous solutions either failed to give any water-repellency at all or else if water-repellency was induced, it was of a greatly inferior nature. The combination of the alkali-metal silicate and the alkali-metal silanolate gave greatly improved water-repellency over either of the ingredients themselves and could be used on a variety of masonry surfaces with good effects. Moreover, the ability to use large amounts of the alkali-metal silicate with the alkali-metal silanolate enables one to greatly reduce the cost of the treating mixture because of the necessity of using less of the more expensive silanolate and yet improve the degree of water-repellency. In addition, of particular importance in the use of this mixture of the alkali-metal silicate and the alkali-metal silanolate is the fact that they can be employed as water solution, thus dispensing with the necessity for using expensive and hazardous organic solvents.

The alkali-metal silanolates employed in the practice of the present invention may be prepared from mono-organosilane triols or their condensation products and are described, for example, by Meads and Kipping, Journal of the Chemical Society, 105, page 679. The metallic salts can be prepared, for example, by hydrolyzing derivatives of a monohydrocarbon-substituted silane containing three hydrolyzable radicals, for instance, halogen atoms, alkoxy radicals, etc., connected to silicon, recovering the hydrolysis products, and dissolving these products in an aqueous solution of an alkali-metal hydroxide in such proportion that there is preferably though not necessarily present at least one equivalent of base per silicon atom. Further directions for making the metallic salts may be found disclosed in Krieble and Elliott Patent 2,507,200, issued May 9, 1950.

The hydrolyzable monohydrocarbon-substituted silanes described above may be considered as having the formula $RSiX_3$, where R is a monovalent hydrocarbon radical, for example, alkyl (e.g., methyl, ethyl, propyl, isopropyl, butyl, hexyl, decyl, etc.)., aryl (e.g., phenyl, naphthyl, biphenyl, etc.), aralkyl (e.g., benzyl, phenylethyl, etc.), alkaryl (e.g., tolyl, xylyl, etc.), and substituted hydrocarbon radicals in which the substituent is non-reactive with the hydrolyzable medium or with the inorganic base used to make the metallic salt. Such substituents are, for instance, halogens, e.g., chlorine, bromine, fluorine, etc. In the above formula, X may be a halogen, for instance, chlorine, bromine, fluorine, etc.; alkoxy, e.g., methoxy, ethoxy, propoxy, etc.; amino groups, e.g., the $-NH_2$ grouping. Preferably, X is a halogen, particularly chlorine.

Generally, it is desirable when making the alkali-metal silanolate solution in water, to obtain it in a concentrated form, for example, of the order of about 20 to 50% total solids content and thereafter mixing it with the alkali-metal silicate and diluting it further with water to the desired concentration applicable for spraying or coating various types of masonry.

The alkali-metal silicates employed in the practice of the present invention are those which are readily soluble in water and include, for instance, sodium silicate (also known as "water glass"), potassium silicate, etc. Most silicates are loosely joined combinations of alkali and silica and the formula for such silicates is usually written to show this fact, that is, an alkali-metal silicate having a ratio of 1 part alkali and 3.22 parts silica would carry the formula $M_2O:3.22SiO_2$. In general, although I may advantageously employ any water-soluble alkali-metal silicate, for most applications it is desirable that the silicates have percentage ratios of the alkali and of the silica within the range of $2M_2O:SiO_2$ to $MO:3.75SiO_2$ where M in the above ratios stands for an alkali-metal atom, for example, sodium, potassium, etc. Aqueous solutions of these alkali-metal silicates can be obtained in various concentrations as evidenced by their varying specific gravities, for instance, from a specific gravity of 1.318 (35° Baumé/68° F.) to a specific gravity of about 1.871 (67.5° Baumé/68° F.). It will of course be apparent to those skilled in the art, that instead of using aqueous solutions of alkali-metal silicates one can add solid alkali-metal silicates to water containing the alkali-metal silanolate to form a homogeneous solution of both the alkali-metal silicate and the alkali-metal silanolate.

The proportions of alkali-metal silicate and alkali-metal silanolate used may be varied within very broad ranges. For optimum efficiency, on a weight basis, one may employ from 0.1 to 30 parts of the alkali-metal silicate per part of the alkali-metal silanolate, calculating the alkali-metal silanolate as having the formula $RSiO_2M$, where R is a monovalent hydrocarbon radical and M is an alkali-metal, e.g., sodium, potassium, cesium, etc.

When making the aqueous solution of the alkali-metal silanolate and alkali-metal silicate for treatment purposes, it is desirable that low concentrations of the mixture be employed and that generally concentrations of the two ingredients ranging, by weight, from about 0.5 to 15%, or more, based on the total weight of the aqueous solution containing the two alkali-metal ingredients, may be used, again calculating the alkali-metal silanolate as having the formula $RSiO_2M$. Stated alternatively, the concentrations of the combination of the alkali-metal silicate and the alkali-metal silanolate, this time calculating the alkali-metal silanolate as the final polysiloxane having the formula $RSiO_{1.5}$ where R has the meanings given above, are preferably of the order of from about 0.5 to about 6%, by weight, or more, based on the total weight of the aqueous solution.

It will, of course, be apparent to those skilled in the art that smaller or larger concentrations may be employed, depending on the material treated, the degree of water-repellency desired, and the type of metallic salts used. However, within the ranges described above, for many applications optimum penetration and effective water-repellency are obtained. It may be desired to add small amounts of alcohols or ketones to the water solution in order to enhance the stability of such solutions and lower their freezing point. In this respect small amounts of alcohols, ketones or ethers are employed which are miscible with the water solution. Ethanol is particularly effective and renders water solutions of the metallic salts stable in concentrations ranging from about 1 to 40 percent metallic salts. If desired, small amounts, say up to 10 percent, by weight, based on the combined weights of the alkali-metal salts, can be added to the water solution of the alkali-metal salts.

In order that those skilled in the art may better understand how the present invention may be practiced, the following examples are given by way of illustration and not by way of limitation. All parts are by weight.

EXAMPLE 1

1 mol of methyltrichlorosilane was hydrolyzed by adding it rapidly with stirring to a large excess of water. The amount of water present was substantially in excess over that required to effect complete hydrolysis of all the silicon-bonded chlorine in the methyltrichlorosilane. The resultant solution was allowed to stand until substantially all the methylpolysiloxane had precipitated in the form of a fine powder. This powder was filtered from the remaining solution, washed to remove acid, filtered, and dried. The solid gel particles were dissolved by stirring with a 50 percent, by weight, aqueous sodium hydroxide solution. Generally one mol of the methylpolysiloxane is allowed to react with about 1 to 1.05 mols of sodium hydroxide to give the sodium salt of methyl silanetriol (hereinafter for brevity referred to as "sodium silanolate"). The resultant alkaline solution had a total solids content of about 46.7 percent of which about 14.3 percent was titrated as sodium oxide and contained about 30 percent methylpolysiloxane solids calculated as $CH_3SiO_{1.5}$ (about 2.4 percent was impurities like NaCl or $Na_2CO_3$). The composition had a specific gravity of about 1.35 at 25° C. and a pH of about 13. This sodium salt of methyl silanetriol (which is also known as sodium methyl siliconate) is believed to have structure I in dilute aqueous solutions, and it can be dried to a white solid having structure II as its molecular formula:

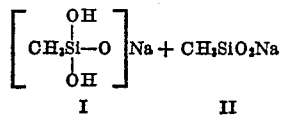

The sodium salt of methyl silanetriol prepared above was diluted with water so that the solution contained about 20% methylpolysiloxane solids calculated as $CH_3SiO_{1.5}$.

In the following examples varying concentrations of sodium silicate and the above-described sodium salt of methyl silanetriol in the form of the aforesaid 20% solids aqueous solution (the solids being calculated as $CH_3SiO_{1.5}$), were employed in making various treating mixtures which were used to coat and impregnate various types of masonry. The sodium silicate employed was in the form of a 50% solids aqueous solution (about $1Na_2O:3SiO_2$). For brevity, the sodium salt of methyl silanetriol will be referred to in the following examples and in the tables found therein as "sodium silanolate." In the following examples when reference is made to the sodium silanolate, it will be to the actual amount of this particular salt (calculated as $CH_3SiO_{1.5}$) in the form of the 20% solids aqueous solution referred to above.

EXAMPLE 2

A treating solution was prepared by mixing together 2 parts of the sodium salt of methyl silanetriol (in the form of the aforesaid 20% methylpolysiloxane solids aqueous solution), 20 parts of the sodium silicate aqueous solution, and 70 parts water. This aqueous solution was applied by spraying on asbestos-cement shingles and the latter allowed to dry at room temperature (about 27° C.); at the end of this time, it was found that the asbestos-cement shingles were more water-repellent than the same shingles treated with either the sodium silicate solution alone or with the solution of methyl silanetriol alone.

EXAMPLE 3

In this example various combinations of the sodium silicate soluiton and of the solution of the sodium salt of methyl silanetriol described in Example 2 (the latter having a methylpolysiloxane solids content of 20%) were prepared and used to treat common brick. The tests for treating the bricks were as follows. The bricks were dried to constant weight at 80° C. They were then immersed in the treating solution for 15 seconds, removed and allowed to dry at room temperature (about 28° C.) for 48 hours. They were then immersed in water for 72 hours, removed, surface-dried by blotting and weighed immediately. The following Table I shows the treating solution employed in each instance and includes not only the mixtures of the sodium silicate and the sodium salt of methyl silanetriol, but also controls in which the brick was treated with each of the ingredients separately. Table I shows the percent water pick-up in each instance.

*Table 1*

| Run No. | Aqueous Treating Solution | Percent Water Pick-up |
|---|---|---|
| 1 | No treatment | 12.8 |
| 2 | 0.25% sodium silicate | 11.7 |
| 3 | 5% sodium silicate | 11.2 |
| 4 | 0.25% sodium silanolate | 8.79 |
| 5 | 0.5% sodium silanolate | 7.75 |
| 6 | 1% sodium silanolate | 1.2 |
| 7 | 1.25% sodium silicate plus 0.25% sodium silanolate | 0.73 |
| 8 | 2.5% sodium silicate plus 0.5% sodium silanolate | 0.39 |
| 9 | 5% sodium silicate plus 1% sodium silanolate | 0.37 |

EXAMPLE 4

In this example, 2 inch mortar cubes were prepared in accordance with Federal Specification SS–W–00110 (GSA–FSS). Cubes prepared in this fashion were immersed in various treating soluitons for 15 seconds, allowed to dry at room temperature for 48 hours, weighed and immersed in ¼" of water for 72 hours, at the end of which time they were dried by blotting and immediately reweighed. The following Table II shows the percent water pick-up in the case of each of the tests conducted on the mortar cubes.

Table II

| Run No. | Aqueous Treating Solution | Percent Water Pick-up |
|---|---|---|
| 10 | No treatment | 10.3 |
| 11 | 2% sodium silanolate | 6.0 |
| 12 | 3% sodium silanolate | 7.63 |
| 13 | 10% sodium silicate | 7.8 |
| 14 | 2% sodium silanolate plus 10% sodium silicate | 2.09 |

It will, of course, be apparent to those skilled in the art that instead of using sodium silicate, other alkali-metal silicates may be used in their place in the same or different proportions thereof, as, for instance, potassium silicate, lithium silicate, etc. In addition, it will also be apparent to those skilled in the art that varying proportions of the silicate and the alkali-metal silanolate can be employed as well as different concentrations of these two ingredients in the treating solution can be employed without departing from the scope of the invention. Additionally, the invention is not to be considered limited to the sodium salt of methyl silanetriol described in the foregoing examples but other hydrocarbon-substituted silanetriol salts may be employed as, for example, the metallic (e.g., sodium, potassium, cesium, etc.) salts of phenyl silanetriol (which may be prepared by hydrolyzing phenyltrichlorosilane and dissolving the hydrolysis product in a strong inorganic base), ethyl silanetriol, benzyl silanetriol, tolyl silanetriol, etc., salts. It is to be understood that the particular concentrations of the metallic salts in water described above are not intended to be limiting and lower or higher concentrations of such metallic salts may be employed without departing from the scope of the invention.

A satisfactory aqueous solution of the mixture of ingredients used to render the masonry water-repellent comprises, by weight, from about 75 to 99% water and from 1 to 25% of the mixture of the alkali-metal silicate and the alkali-metal salt of the hydrocarbon-substituted silanetriol in which the proportion of the silicate and the silanolate is within the range of 0.1 to 30 parts of the alkali-metal silicate per part of the alkali-metal silanolate, calculating the alkali-metal silanolate on the basis of the formula $RSiO_{1.5}$, where R has the meaning given above. On a weight basis the aqueous mixture containing the alkali-metal silicate and the alkali-metal silanolate preferably comprise, by weight, from 75 to 99% water, from 0.1 to 10% of the alkali-metal silanolate, and from 0.1 to 30% of the alkali-metal silicate, again calculating the alkali-metal silanolate in the manner described above.

While the invention has been described with specific reference with the treatment of brick, mortar, and asbestos-cement shingles, it will be apparent that other masonry surfaces may also be treated to render the same water-repellent. The term "masonry" is intended to include all inorganic non-metallic materials which are porous to water such as asbestos shingles, asbestos boards, bricks, mortar, stone, limestone, stucco, and the like.

What I claim as new and desire to secure by Letters Patent of the United States is:

1. An aqueous solution for rendering masonry water-repellent consisting essentially of, by weight, (a) water, (b) from 0.25 to 10% of an alkali-metal salt of a hydrocarbon-substituted silanetriol calculated as $RSiO_{1.5}$, where R is a monovalent hydrocarbon radical, and (c) from 1.25 to 30% of an alkali-metal silicate, the weights of (b) and (c) being based on the total weight of the aqueous solution.

2. An aqueous solution for rendering masonry water-repellent consisting essentially of, by weight, (a) water, (b) from 0.25 to 10% of a sodium salt of methyl silanetriol calculated as $CH_3SiO_{1.5}$, and (c) from 1.25 to 30% of sodium silicate, the weights of (b) and (c) being based on the total weight of the aqueous solution.

3. An aqueous solution for rendering masonry water-repellent consisting essentially of, by weight, (a) water, (b) from 0.25 to 10% of the sodium salt of phenyl silanetriol, calculated as $C_6H_5SiO_{1.5}$, and (c) from 1.25 to 30% of sodium silicate, the weights of (b) and (c) being based on the total weight of the aqueous solution.

4. The process for rendering masonry water-repellent which comprises (a) forming an aqueous solution of a mixture of ingredients consisting essentially of (1) sodium silicate and (2) the sodium salt of methyl silanetriol, the sodium silicate comprising from 1.25 to 30%, by weight, and the sodium salt of methyl silanetriol, calculated as $CH_3SiO_{1.5}$ being present, by weight, in an amount equal to from 0.25 to 10%, the weights of the sodium silicate and of the sodium salt of the silanetriol being based on the total weight of the aqueous solution, and (b) applying the aforesaid aqueous solution to masonry.

5. The process for rendering masonry water-repellent which comprises (a) forming an aqueous solution of a mixture of ingredients consisting essentially of (1) sodium silicate and (2) the sodium salt of phenyl silanetriol, the sodium silicate comprising from 1.25 to 30%, by weight, and the sodium salt of phenyl silanetriol, calcuated as $C_6H_5SiO_{1.5}$ being present, by weight, in an amount equal to from 0.25 to 10%, the weights of the sodium silicate and of the sodium salt of the triol being based on the total weight of the aqueous solution, and (b) applying the aforesaid aqueous solution to masonry.

References Cited in the file of this patent

UNITED STATES PATENTS

| 1,129,320 | Vail et al. | Feb. 23, 1915 |
| 2,507,200 | Elliott et al. | May 9, 1950 |